US012270426B2

(12) United States Patent
Ross et al.

(10) Patent No.: US 12,270,426 B2
(45) Date of Patent: Apr. 8, 2025

(54) APPARATUS AND METHODS FOR LIGHTNING PROTECTION AND LOCATING OF FASTENER NUTS WITH DIELECTRIC MATERIALS (71) Applicant: The Boeing Company, Chicago, IL (US)

(72) Inventors: Joshua A. Ross, Woodinville, WA (US); James F. Ackermann, Woodinville, WA (US); Brian H. Korenga, Seattle, WA (US)

(73) Assignee: The Boeing Company, Arlington, VA (US)

(*) Notice: Subject to any disclaimer, the term of this patent is extended or adjusted under 35 U.S.C. 154(b) by 395 days.

(21) Appl. No.: 17/689,700

(22) Filed: Mar. 8, 2022

(65) Prior Publication Data
US 2022/0316518 A1    Oct. 6, 2022

Related U.S. Application Data (60) Provisional application No. 63/170,872, filed on Apr. 5, 2021.

(51) Int. Cl.
F16B 33/00    (2006.01)
F16B 37/14    (2006.01)

(52) U.S. Cl.
CPC .......... F16B 33/004 (2013.01); F16B 33/002 (2013.01); F16B 37/14 (2013.01); *F16B 33/00* (2013.01)

(58) Field of Classification Search
CPC ...... F16B 33/00; F16B 33/002; F16B 33/004; F16B 37/045; F16B 37/14; F16B 39/00;
(Continued)

(56) References Cited

U.S. PATENT DOCUMENTS 2,041,828 A * 5/1936 Greenwood ............ E01B 11/04
411/81
2,237,595 A * 4/1941 Dyer ..................... F16B 37/044
411/84
(Continued)

FOREIGN PATENT DOCUMENTS

EP    0425292 A1    5/1991
EP    3128188 A1    2/2017
EP    3260708 A1    12/2017

OTHER PUBLICATIONS

European Patent Office; Office Action for Application No. 22159763.6 dated Dec. 12, 2023.
(Continued)

*Primary Examiner* — Kristina R Fulton
*Assistant Examiner* — Jock Wong
(74) *Attorney, Agent, or Firm* — Walters & Wasylyna LLC (57) ABSTRACT A fastening system for aerospace vehicles including a dielectric nut retainer strip formed of dielectric material and having at least one fastener thru hole and at least one cap receiver portion. Also included are an anti-rotation nut retainer portion integrally formed in the dielectric nut retainer adjacent to the at least one fastener thru hole, a cap configured to mate with the at least one cap receiver portion, a fastener covered in a conductive coating, and an anti-rotation nut configured to fit in the anti-rotation nut retainer portion and couple with the fastener.

20 Claims, 9 Drawing Sheets (58) Field of Classification Search
CPC ...... F16B 39/10; F16B 39/101; F16B 41/005; F16B 23/0007; F16B 23/0061; F16B 23/0069; F16B 23/0076; F16B 31/02; Y10S 411/91
USPC ....... 411/81, 84–85, 91, 366.3, 372.5–372.6, 411/373
See application file for complete search history.

(56) References Cited

U.S. PATENT DOCUMENTS

| | | | | |
|---|---|---|---|---|
| 2,249,923 | A * | 7/1941 | Whitcombe | F16B 37/045 411/85 |
| 3,259,165 | A * | 7/1966 | Tobian | F16B 37/044 411/85 |
| 4,488,844 | A * | 12/1984 | Baubles | F16B 37/045 411/177 |
| 4,895,484 | A * | 1/1990 | Wilcox | F16B 37/044 411/85 |
| 7,633,283 | B2 * | 12/2009 | Georgeson | B64D 45/02 324/179 |
| 8,303,223 | B2 * | 11/2012 | Rass | F16B 37/045 248/58 |
| 8,894,338 | B2 | 11/2014 | Dobbin et al. | |
| 9,400,007 | B2 | 7/2016 | Dobbin et al. | |
| 9,416,811 | B2 | 8/2016 | Dobbin | |
| 9,506,493 | B2 | 11/2016 | Dobbin | |
| 9,599,141 | B2 | 3/2017 | Dobbin | |
| 9,764,854 | B2 | 9/2017 | Dobbin et al. | |
| 9,829,030 | B2 | 11/2017 | Dobbin et al. | |
| 9,951,804 | B2 | 4/2018 | Dobbin et al. | |
| 10,054,151 | B2 | 8/2018 | Dobbin et al. | |
| 10,215,216 | B2 | 2/2019 | Dobbin et al. | |
| 10,220,957 | B2 | 3/2019 | Dobbin | |
| 10,240,628 | B2 | 3/2019 | Dobbin | |
| 10,308,373 | B2 | 6/2019 | Dobbin | |
| 10,385,907 | B2 | 8/2019 | Dobbin | |
| 10,415,623 | B2 | 9/2019 | Dobbin | |
| 10,428,860 | B2 | 10/2019 | Dobbin et al. | |
| 10,774,869 | B2 | 9/2020 | Dobbin | |
| 2007/0065249 | A1 * | 3/2007 | Gosis | F16B 37/061 411/84 |
| 2013/0259604 | A1 | 10/2013 | Whitlock | |

OTHER PUBLICATIONS

European Patent Office; Extended European Search Report for Application No. 22159763.6 dated Jul. 27, 2022.

* cited by examiner

APPARATUS AND METHODS FOR LIGHTNING PROTECTION AND LOCATING OF FASTENER NUTS WITH DIELECTRIC MATERIALS

CROSS-REFERENCE TO RELATED APPLICATIONS

This application claims the benefit of U.S. Provisional Patent Application No. 63/170,872 filed on Apr. 5, 2021, and entitled "APPARATUS AND METHODS FOR LIGHTNING PROTECTION AND LOCATING OF FASTENER NUTS WITH DIELECTRIC MATERIALS," the contents of which are hereby incorporated by reference herein.

FIELD OF THE DISCLOSURE

This disclosure relates to systems and methods for electrically isolating fasteners in a flammable environment. More particularly, this disclosure relates to systems and methods for using dielectric materials to isolate fasteners during close out of an aerospace vehicle wing, fuselage, panel, or the like.

BACKGROUND

One issue faced by aerospace vehicle manufacturers is providing lightning protection for the aerospace vehicles when in flight. This is particularly an issue for carbon-fiber (or other composite) aerospace vehicle components. Often, aerospace vehicle wings, which typically contain fuel tanks, are of particular concern and metal fasteners used on the wings should be electrically isolated to prevent ignition hazards from lightning and the like.

The issue of electrical isolation is further complicated when the fasteners need to be removable for safety and maintenance inspections and the like. This is further complicated when the wing is thin (e.g., for hyper-sonic aerospace vehicles) and access to the fasteners is difficult or otherwise inconvenient. Typical solutions to these and other issues for wings include adding access panels or the like to allow inspection, removal, and replacement of fasteners or other parts. However, access panels add to the overall weight and drag of the wing structure which is, typically, undesirable.

Other solutions include using fasteners inserted from an accessible side of the aerospace vehicle component that crimp on an inaccessible side to connect the parts. However, such fasteners are not easily removable without destroying the fastener and requiring, if possible, re-insertion of new fasteners. Other drawbacks, inconveniences, inefficiencies, and issues also exist with current systems and methods.

SUMMARY

Disclosed embodiments address the above-noted, and other, drawbacks, inconveniences, and inefficiencies, of current systems and methods. Accordingly, disclosed embodiments include a fastening system for aerospace vehicles including a dielectric nut retainer strip formed of dielectric material having at least one fastener thru hole and at least one cap receiver portion, an anti-rotation nut retainer portion integrally formed in the dielectric nut retainer adjacent to the at least one fastener thru hole, a cap configured to mate with the at least one cap receiver portion, a fastener, and an anti-rotation nut configured to fit in the anti-rotation nut retainer portion and couple with the fastener. In further disclosed embodiments the cap may be a dielectric material. In still further disclosed embodiments the fastener is covered in a conductive coating.

Disclosed embodiments also include a stiffening member formed in the dielectric nut retainer strip, and a substructure fastener portion on the dielectric nut retainer strip configured to engage at least a portion of an aerospace vehicle substructure. In further disclosed embodiments, the substructure fastener portion is configured to engage a portion of a substructure that is interior to an aerospace vehicle wing. In still further disclosed embodiments the fastener is insertable from outside the aerospace vehicle wing into the at least one fastener thru hole of the dielectric nut retainer strip.

In some disclosed embodiments the conductive coating may be indium paste. In some disclosed embodiments the conductive coating may be a conductive sleeve.

Disclosed embodiments include a dielectric nut retainer system including a dielectric nut retainer strip having one or more fastener thru holes, an integrally formed nut retention pocket adjacent to each of the one or more fastener thru holes, a cap formed at each of the one or more fastener thru holes on an opposite side from the nut retention pocket, and a dielectric nut retainer strip attachment hole that enables attachment of the dielectric nut retainer strip to a structural element. Disclosed embodiments also include at least one anti-rotation nut configured to engage the nut retention pocket. In some disclosed embodiments the dielectric nut retainer system includes at least one fastener comprising a conductive coating and configured to be insertable into the one or more fastener thru holes.

Disclosed embodiments include a method for assembling an aerospace vehicle wing, the method including inserting at least one nut in at least one nut retention pocket formed on a dielectric nut retainer strip, attaching the dielectric nut retainer strip to a wing substructure over a fastener hole, applying at least one cap to the dielectric nut retainer strip over the at least one nut in the at least one nut retention pocket, locating a wing skin over the fastener hole, inserting a fastener through the wing skin into the fastener hole, and fastening the fastener to the at least one nut.

In some disclosed embodiments the method for assembling an aerospace vehicle wing, after applying at least one cap to the dielectric nut retainer strip, may also include applying a conductive coating to the fastener hole and the at least one nut. In some disclosed embodiments the conductive coating may be indium paste. In some disclosed embodiments the method may include coating the fastener with a conductive coating. In some disclosed embodiments the conductive coating may be indium paste.

Disclosed embodiments include a method of manufacturing a dielectric nut retainer strip, the method including forming a strip of dielectric material with a first side comprising at least two cap receiver portions configured to accept a cap, and forming an anti-rotation nut retainer portion in a second side of the strip of dielectric material at a location opposite of each of the at least two cap receiver portions. Some disclosed embodiments may also include forming a substructure engagement portion configured to engage a substructure of an aerospace vehicle. Some disclosed embodiments may also include forming a stiffening member on at least one edge of the strip of dielectric material.

Disclosed embodiment also include a fastening system for aerospace vehicles including a dielectric carrier strip having one or more fastener thru holes, one or more nut plates configured to align over the one or more fastener thru holes and further having one or more nut plate fasteners to attach the one or more nut plates to the dielectric carrier strip, and a metallic dome configured to align over the one or more fastener thru holes and couple with a fastener. Further disclosed embodiments may include the metallic dome being integrally formed on the one or more nut plates. Other embodiments also exist.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

It should be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

It should also be understood that, as used herein, "aerospace vehicle" refers to any vehicle capable of flight in the air, space, or combinations thereof, and includes airplanes, spacecraft, manned vehicles, unmanned vehicles, remotely piloted vehicles, military vehicles, commercial vehicles, and the like.

Figure 1:
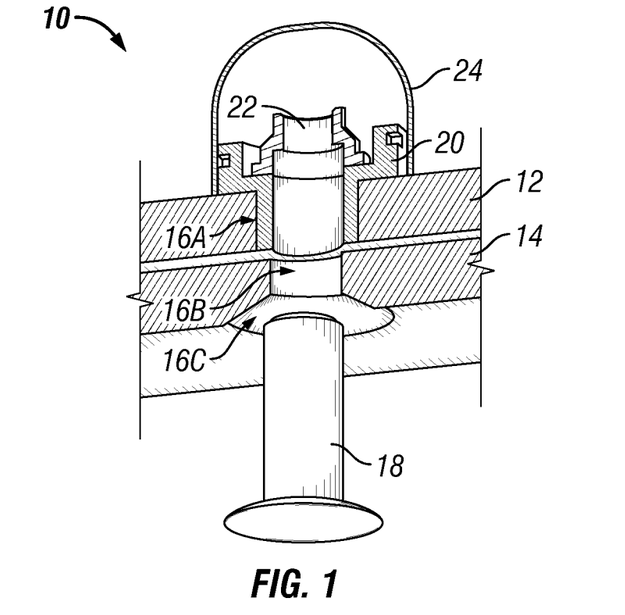
FIG. 1 is a schematic overview of a typical basic fastening system for aerospace vehicles in accordance with disclosed embodiments.

FIG. 1 is a schematic overview of a typical basic fastening system 10 for aerospace vehicles in accordance with disclosed embodiments. As shown a first component 12 may be fastened to a second component 14. First component 12 may be a metallic or composite substructure component (e.g., a wing spar, or the like) of an aerospace vehicle. Second component 14 may, likewise, be a metallic or composite component (e.g., a wing or fuselage skin, or the like). First component 12 may have a fastener thru hole 16A bored or otherwise formed in it, and second component 14 may have a corresponding fastener thru hole 16B bored or otherwise formed in it. One or more of the fastener thru holes 16A-B may also have a countersink portion 16C to accommodate the fastener 18 head. A nut plate 20 is inserted into one of the fastener thru holes (e.g., fastener thru hole 16A) and swaged to hold a nut 22 in place for coupling with fastener 18.

In embodiments where electromagnetic effect (EME) considerations are needed (e.g., inside or around a fuel tank) fastener 18 may be covered in a conductive coating, such as an indium coated Torx head fastener, a fastener wrapped in a conductive sleeve, or the like. Likewise, a metallic (or other) dome 24 may be crimped onto the nut plate 20 and appropriately coated with EME paste or other sealants.

Figure 2:
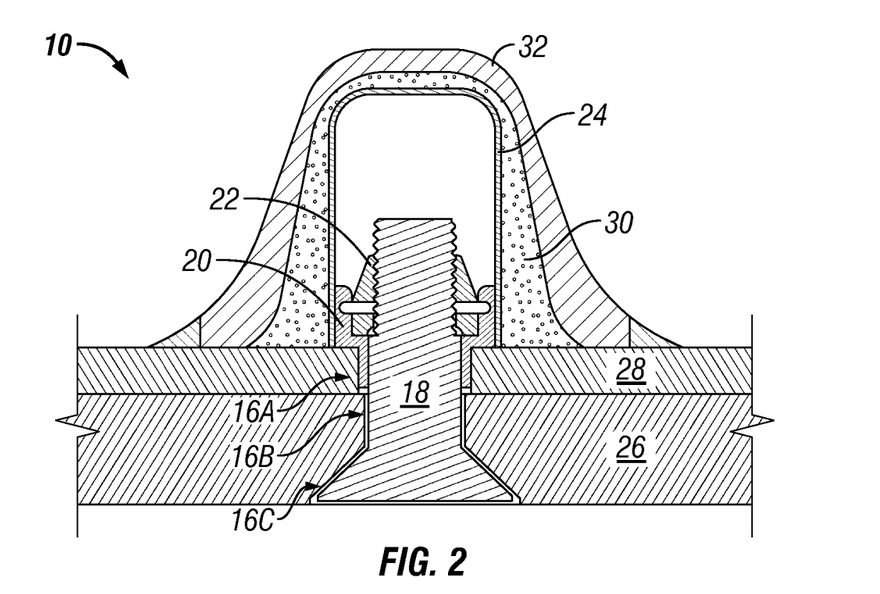
FIG. 2 is a cross-sectional view of an assembled fastening system in accordance with disclosed embodiments.

FIG. 2 is a cross-sectional view of an assembled fastening system 10 in accordance with disclosed embodiments. As shown, a wing skin 26 is fastened to a spar 28 inside or near a fuel tank (not shown). As also shown, a fuel sealant 30, such as PR-1776 Class B Low Weight fuel tank sealant made by PPG Industries, Inc., or the like, may be applied over metal dome 24 to inhibit fuel leakage. Additionally, a cap sealant 32, such as TROGAMID®, or the like, may be applied over the fuel sealant 30. Additional, or fewer, sealants may be applied as desired in accordance with the location, environment, intended use, and the like, for the fastened components.

Figure 3:
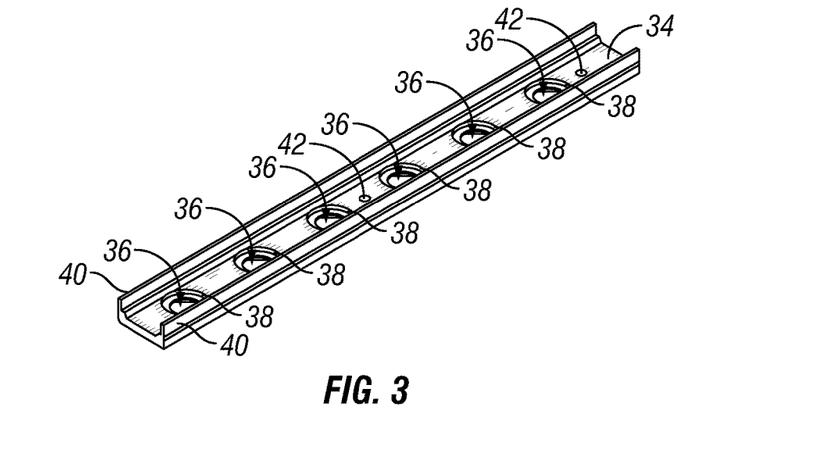
FIG. 3 is an isometric view of a dielectric nut retainer strip in accordance with disclosed embodiments.

FIG. 3 is an isometric view of a dielectric nut retainer strip 34 in accordance with disclosed embodiments. As shown, embodiment of dielectric nut retainer strip 34 may include one or more fastener thru holes 36. In some embodiments dielectric nut retainer strip 34 may be a crystallizable polyamide, such as TROGAMID®, or the like. Other dielectric materials may also be used. The dielectric nut retainer strip 34 may be machined, molded, extruded, additively manufactured (e.g., 3D-printed), or the like, to form the generally strip shape shown in FIG. 3.

Embodiments of dielectric nut retainer strip 34 include a cap receiver portion 38 that is configured to mate with a cap 48 (not shown in FIG. 3) as disclosed below. Mating of cap 48 and cap receiver portion 38 may be accomplished in any suitable fashion, such as a threaded fit, a snap fit, adhesive fit, or the like.

Embodiments of dielectric nut retainer strip 34 may also include one or more stiffening members 40 which may be ribs, walls, or the like, that contribute to the structural integrity of the dielectric nut retainer strip 34. Embodiments of dielectric nut retainer strip 34 may also include one or more substructure fastener portions 42 that enable fastening of the dielectric nut retainer strip 34 to an aerospace vehicle substructure, such as a wing spar, or the like. Embodiments of substructure fastener portions 42 may be rivet hole, fastener (e.g., screws or bolts) holes, snap-fit portions, rails, or the like. As shown in FIG. 3, substructure fastener portion 42 is a fastener thru hole.

Figure 4:
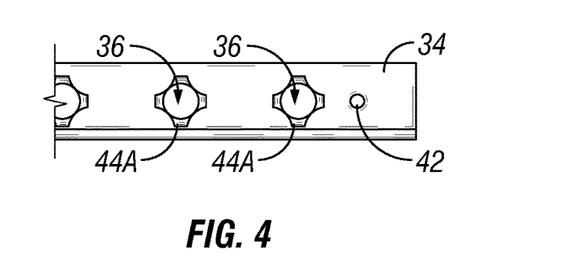
FIG. 4 is a schematic, partial bottom-side view of a dielectric nut retainer strip in accordance with disclosed embodiments.

FIG. 4 is a schematic, partial bottom-side view of a dielectric nut retainer strip 34 in accordance with disclosed embodiments. Embodiments of dielectric nut retainer strip 34 may include nut retainer anti-rotation features 44A on the back, or front, side of the dielectric nut retainer strip 34. For example, as shown in FIG. 4, a 4-point star shape may be used to retain a nut 22 and hinder rotation of the nut 22 when retained and when a fastener 18 is being threaded into the nut 22. Other shapes, orientations, sizes, and the like, may also be used for anti-rotation features 44A.

Figure 5:
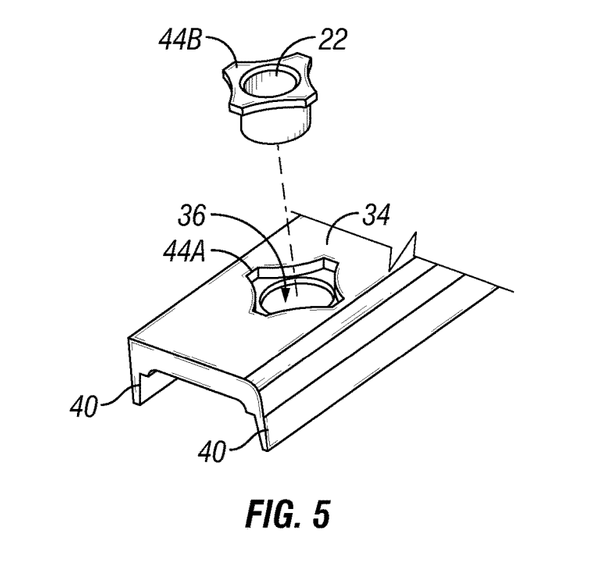
FIG. 5 is a schematic, partial bottom-side view of a dielectric nut retainer strip illustrating nut anti-rotation features in accordance with disclosed embodiments.

FIG. 5 is a schematic, exploded, partial bottom-side view of a dielectric nut retainer strip 34 illustrating nut 22 anti-rotation features 44A-B in accordance with disclosed embodiments. As illustrated, nut 22 will have the corresponding anti-rotation features 44B to mate with the anti-rotation features 44A on the dielectric nut retainer strip 34. As noted, other shapes, orientations, sizes, and the like, may also be used for anti-rotation features 44A-B.

Figure 6:
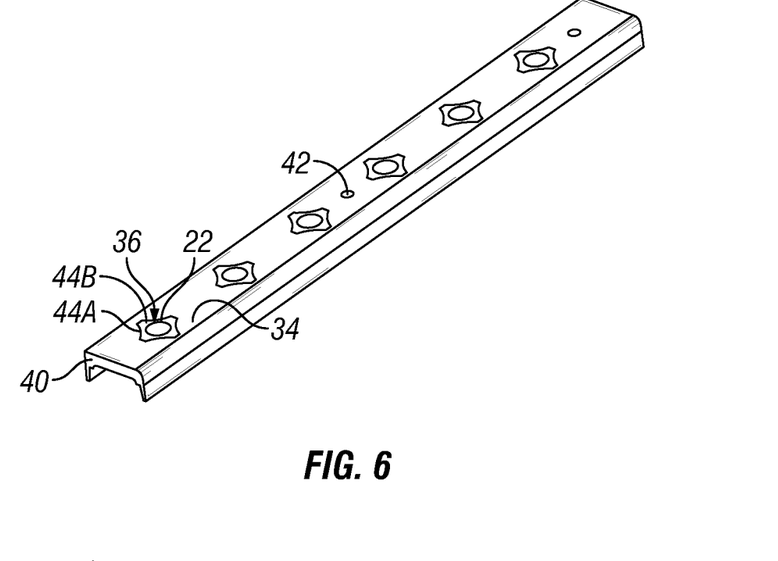
FIG. 6 is a schematic, isometric, bottom-side view of a dielectric nut retainer strip 34 with nuts 22 retained in place in accordance with disclosed embodiments.

FIG. 6 is a schematic, isometric, bottom-side view of a dielectric nut retainer strip 34 with nuts 22 retained in place in accordance with disclosed embodiments. As shown, one or more nuts 22 may be secured into dielectric nut retainer strip 34 by snap-fit, threading, adhesive, or the like.

Figure 7:
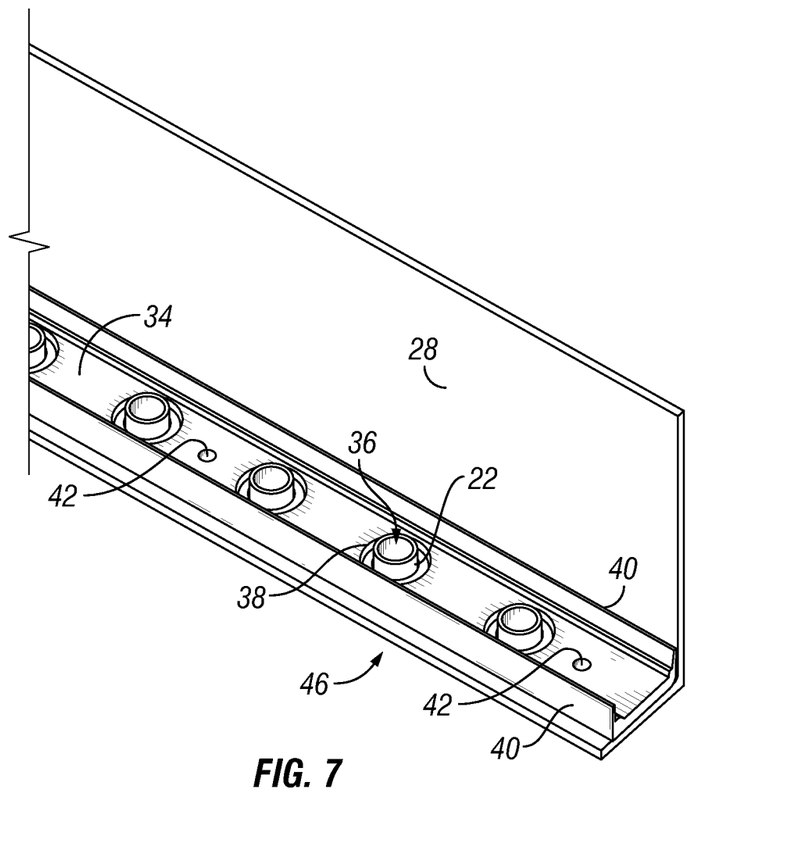
FIG. 7 is an isometric, partial view of an aerospace vehicle component with a dielectric nut retainer strip and nuts installed in place in accordance with disclosed embodiments.
Figure 9:
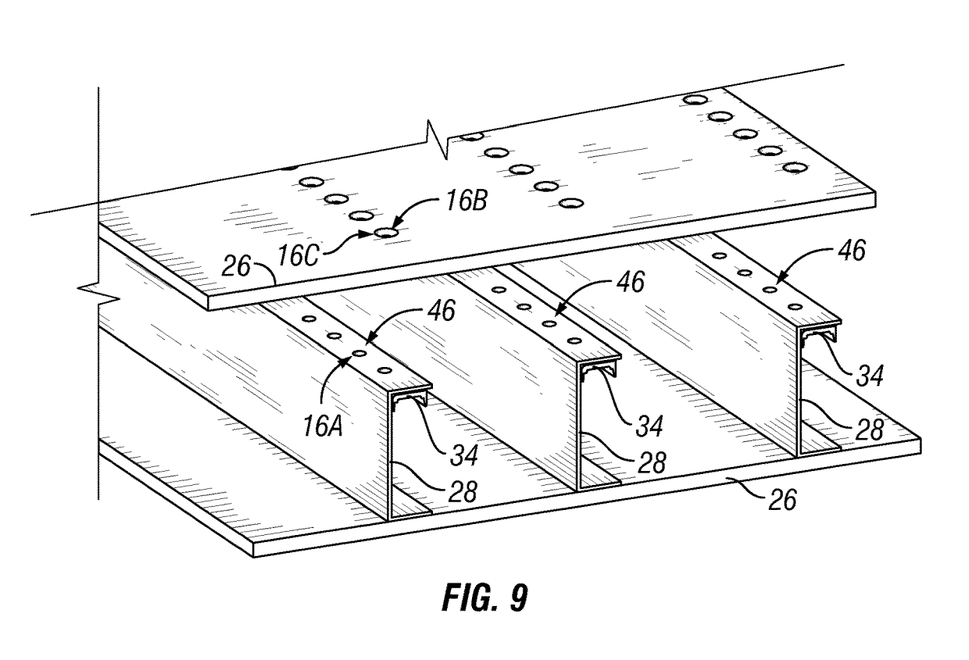
FIG. 9 is an exploded, isometric, partial view of a wing skin installation on one or more wing spars in accordance with disclosed embodiments.

FIG. 7 is an isometric, partial view of an aerospace vehicle component (e.g., wing spar 28) with a dielectric nut retainer strip 34 and nuts 22 installed in place in accordance with disclose embodiments. The view in FIG. 7 shows a bottom view of the spar 28 flange, the surface 46 indicated in FIG. 7 is where the second component (e.g., wing skin 26) is mounted as shown in FIG. 9. Dielectric nut retainer strip 34 may be installed on the component (e.g., wing spar 28) in any appropriate manner, such as, for example, inserting a fastener (not shown) into substructure fastener portions 42, adhering the strip 34, sliding or otherwise engaging a lip or rib (e.g., stiffening members 40) into a reciprocally shaped portion on the component, or the like.

Figure 8:
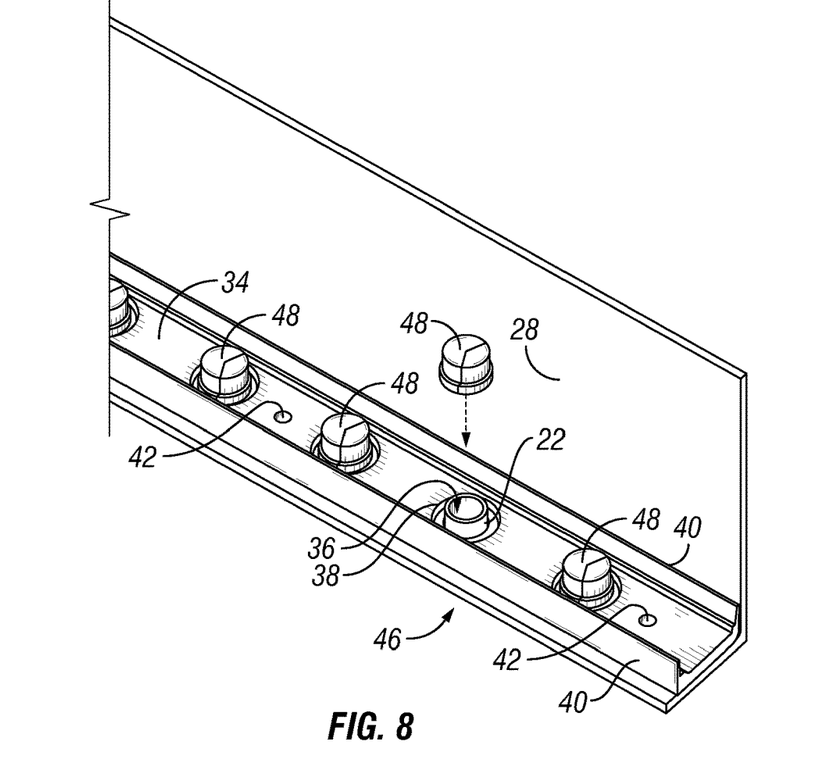
FIG. 8 is a view of the dielectric nut retainer strip of FIG. 7 showing caps installed in accordance with disclosed embodiments.

FIG. 8 is a view of the dielectric nut retainer strip 34 of FIG. 7 showing caps 48 installed in accordance with disclosed embodiments. As shown, caps 48 mate with corresponding cap receiver portions 38 on the dielectric nut retainer strip 34. Mating of the caps 48 and cap receiver portions 38 may be accomplished in any suitable fashion. For example, caps 48 may snap-fit into cap receiver portions 38, may thread into place, may be adhesively secured, or the like. Embodiments of caps 48 may include caps made of dielectric material (e.g., TROGAMID®, or the like). Sealants (e.g., fuel sealants 30, cap sealants 32, or the like) may also be applied over the caps 48.

Figure 10:
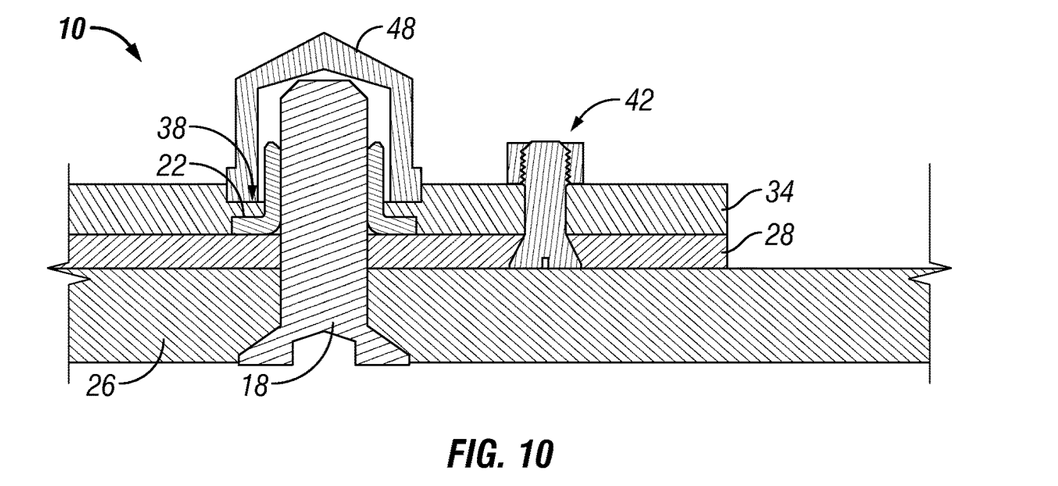
FIG. 10 is a cross sectional view of an assembled wing skin fastening system in accordance with disclosed embodiments.

FIG. 9 is an exploded, isometric, partial view of a wing skin 26 installation on one or more wing spars 28 in accordance with disclosed embodiments. As shown a wing skin 26 having one or more fastener thru holes 16B with a countersink 16C bored, or otherwise formed, therein may be mounted on the mounting surface 46 of one or more wing spars 28. Mounting surface 46 includes one or more fastener thru holes 16A that align with fastener thru holes 16B and fastener thru hole 36 in the dielectric nut retainer strip 34. Fasteners 18 (not shown in FIG. 9) may be inserted from the wing skin 26 outer side into fastener thru hole 16B and 16A and torqued to a desired amount into nut 22 on dielectric nut retainer strip 34. Additional sealants, adhesives, or the like, may also be used. FIG. 10 is a cross sectional view of an assembled wing skin fastening system 10 in accordance with disclosed embodiments.

Figure 11:
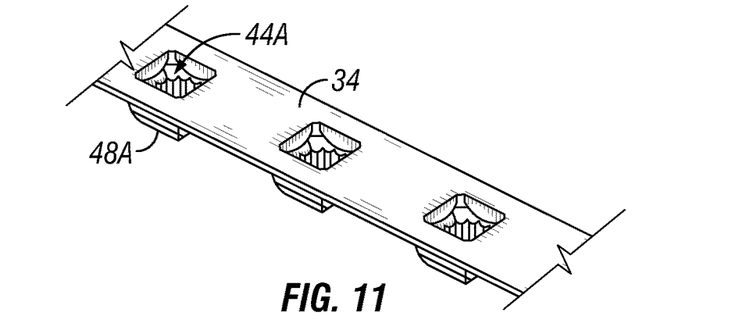
FIG. 11 is an isometric, partial, bottom-side view of a dielectric nut retainer strip in accordance with disclosed embodiments.

FIG. 11 is an isometric, partial, bottom-side view of a dielectric nut retainer strip 34 in accordance with disclosed embodiments. As shown, embodiments of dielectric nut retainer strip 34 may include integrally formed caps 48A and anti-rotation features 44A. In some embodiments dielectric nut retainer strip 34 may be a crystallizable polyamide, such as TROGAIVIID®, or the like. Other dielectric materials may also be used. The dielectric nut retainer strip 34 may be machined, molded, extruded, additively manufactured (e.g., 3D-printed), or the like, to form the generally strip shape shown in FIG. 11.

Figure 12:
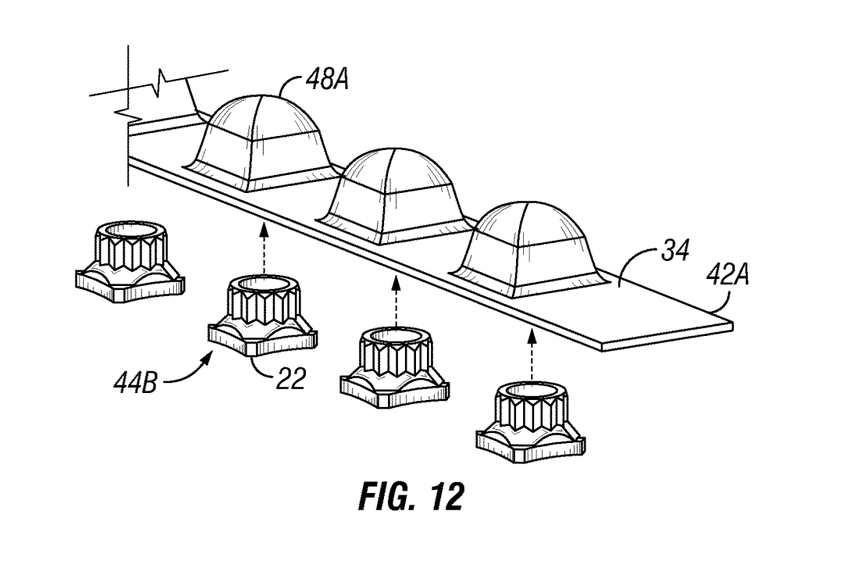
FIG. 12 is an isometric, exploded, partial, top side vide of the dielectric nut retainer strip of FIG. 11.
Figure 13:
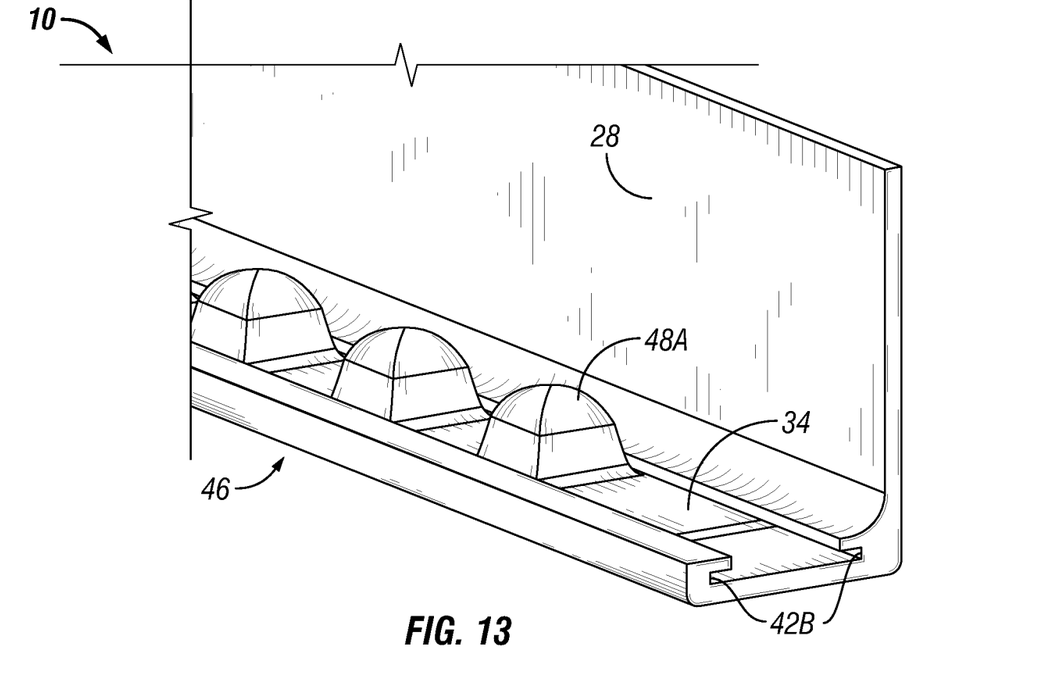
FIG. 13 is an isometric view of an assembled fastening system in accordance with disclosed embodiments.

FIG. 12 is an isometric, exploded, partial, top side vide of the dielectric nut retainer strip 34 of FIG. 11. As shown, one or more nuts 22 having corresponding, or reciprocal, anti-rotation features 44B may be installed in the integral dielectric caps 48A. As disclosed herein, sealants, adhesives, or the like, may also be used during installation. As also shown, dielectric nut retainer strip 34 may include a substructure fastener portion 42A, such as an edge, rib, lip, or the like, configured to engage a corresponding, or reciprocal, fastener portion 42B as shown in FIG. 13.

Figure 14:
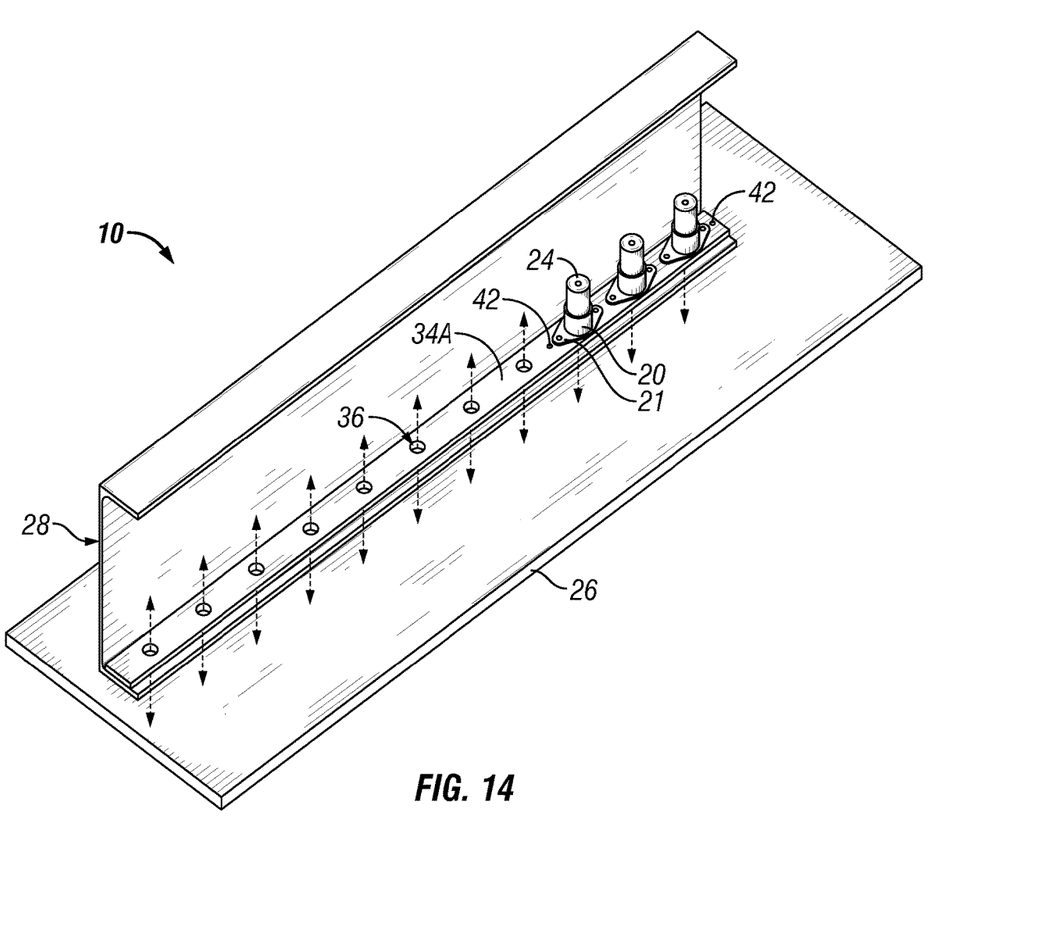
FIG. 14 is an isometric, partial view of a fastening system 10 in accordance with disclosed embodiments.

FIG. 14 is an isometric, partial view of a fastening system 10 in accordance with disclosed embodiments. As shown, embodiments of the disclosed fastening system 10 may include a dielectric carrier strip 34A that is formed of dielectric material such as a crystallizable polyamide, such as TROGAMID®, Fiberglas®, other composites, or the like. Embodiments of dielectric carrier strip 34A may include one or more substructure fastener portions 42 to attach dielectric carrier strip 34A to a first aerospace vehicle component, such as a wing spar 28, or the like. As also shown, dielectric carrier strip 34A includes one or more fastener thru holes 36. In these embodiments, one or more nut plates 20 are fastened to the dielectric carrier strip 34A using nut plate fasteners 21 (e.g., a rivet, bolt, screw, adhesive, or the like) over each of the one or more fastener thru holes 36. Nut plate 20 may include an integral, or attachable, metallic dome 24, or the like.

Figure 15:
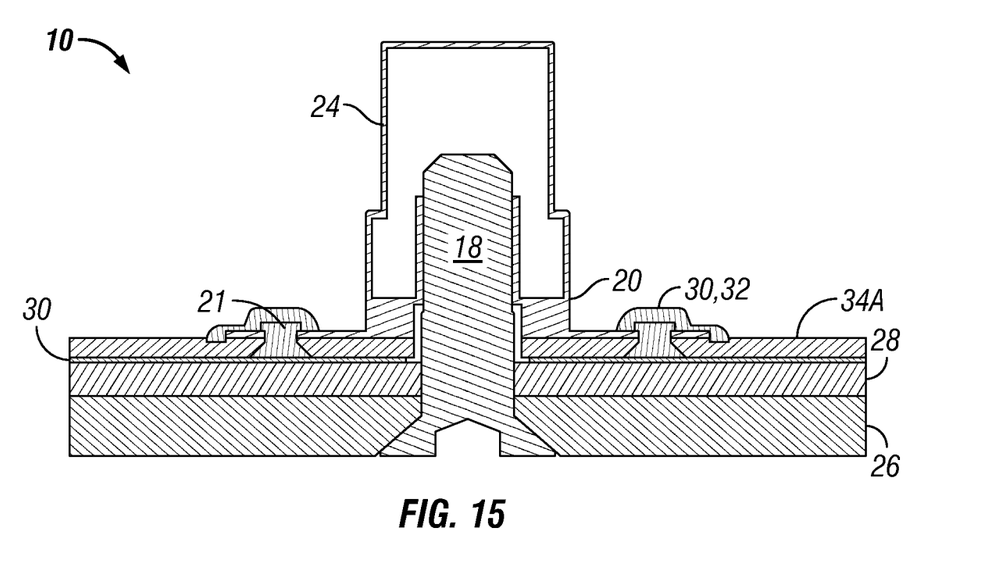
FIG. 15 is a schematic, cross-sectional view of a fastening system of FIG. 14 in accordance with disclosed embodiments.

FIG. 15 is a schematic, cross-sectional view of a fastening system 10 of FIG. 14 in accordance with disclosed embodiments. As shown sealants 30, 32 or other adhesive layers may be applied over nut plate 20, nut plate fasteners 21, or in between spar 28 and dielectric carrier strip 34A as desired. Other configurations are also possible.

Figure 16:
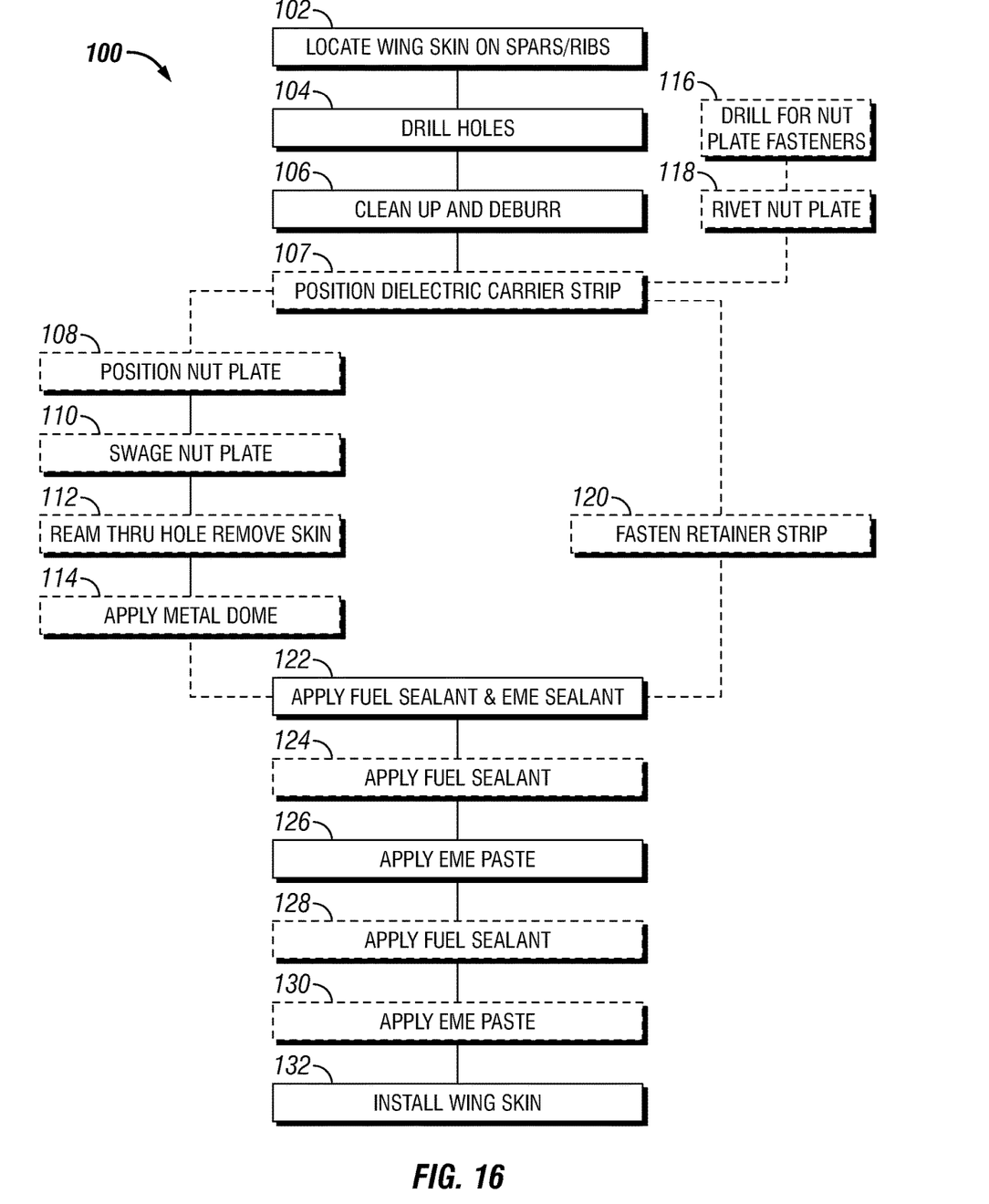
FIG. 16 is a schematic flow chart illustrating methods of assembly in accordance with disclosed embodiments.

FIG. 16 is a schematic flow chart illustrating methods of assembly 100 in accordance with disclosed embodiments. Optional or embodiment-dependent steps are shown in dashed lines. As shown, methods of assembling generally may initiate with locating, at 102, a wing skin 26 (or other aerospace vehicle component) in place over the wing spars 28 (or other substructure components). At 104 thru holes (e.g., 16A-B) may be drilled, reamed, or otherwise formed, through the structural component parts. As indicated at 106, the component parts may then be removed and deburred or otherwise cleaned up for assembly. For embodiments where a dielectric carrier strip 34A is to be used (e.g., FIG. 14), at 107 the carrier strip 34A may be fastened to one of the components being assembled (e.g., wing spar 28). The assembly method 100 then diverges depending upon which embodiment is being assembled.

As shown at 108, for embodiments employing a nut plate 20, or dielectric nut plate retainer strip 34, the nut plate (e.g., 20, 34) may be positioned over fastener thru holes (e.g., 16A-B) and secured in place as disclosed herein. For embodiments that employ a swage nut plate (e.g., FIGS. 1-2), the nut plate 20 may be swaged into place as indicated at 110. As indicated at 112, a fastener thru hole (e.g., 16A-B, 36) may be reamed, drilled, or otherwise formed through the complete assembly stack up. For embodiments that use a metallic dome 24, it may be applied as indicated at 114.

For embodiments that employ a riveted, or otherwise fastened, nut plate 20 (e.g., FIGS. 14-15) assembly may include, at 116, drilling, or otherwise forming, in a dielectric nut retainer strip 34A to include through holes (e.g., matching those at step 104) and nut plate fastener 18 holes. At 118 the nut plate 20 (some embodiments including a metallic dome 24) may be riveted, or otherwise secured, to the dielectric nut plate retainer strip 34A. At 120 the dielectric nut plate retainer strip 34A may be attached to the structural component (e.g., wing spar 28).

As indicated at 122, a fuel sealant (e.g., sealant 30) and an EME paste (e.g., sealant 32) may be applied to the metallic dome 24, cap 48, or integrally formed cap 48A as desired for the particular embodiment being assembled. Additional fuel, or other sealants, may be applied as indicated at 124. As indicated at 126 an EME paste (e.g., indium paste) may be applied to the cap (e.g., 24, 48, 48A) as desired. As indicated at 128, additional fuel sealants (e.g., sealant 30) may be applied to the relevant components. As indicated at 130 additional EME paste (e.g., indium or the like) may be applied to wing skin hole (e.g., 16B) and nut plate 20, dielectric nut retainer strip 34, or dielectric carrier strip 34A, as applicable. At 132 the wing skin 26 (or other component) is located in its final position, any additional sealants (e.g., 30, 32) are applied to fastener 18, and the fastener 18 is torqued to the proper amount to complete the assembly 10.

Figure 17:
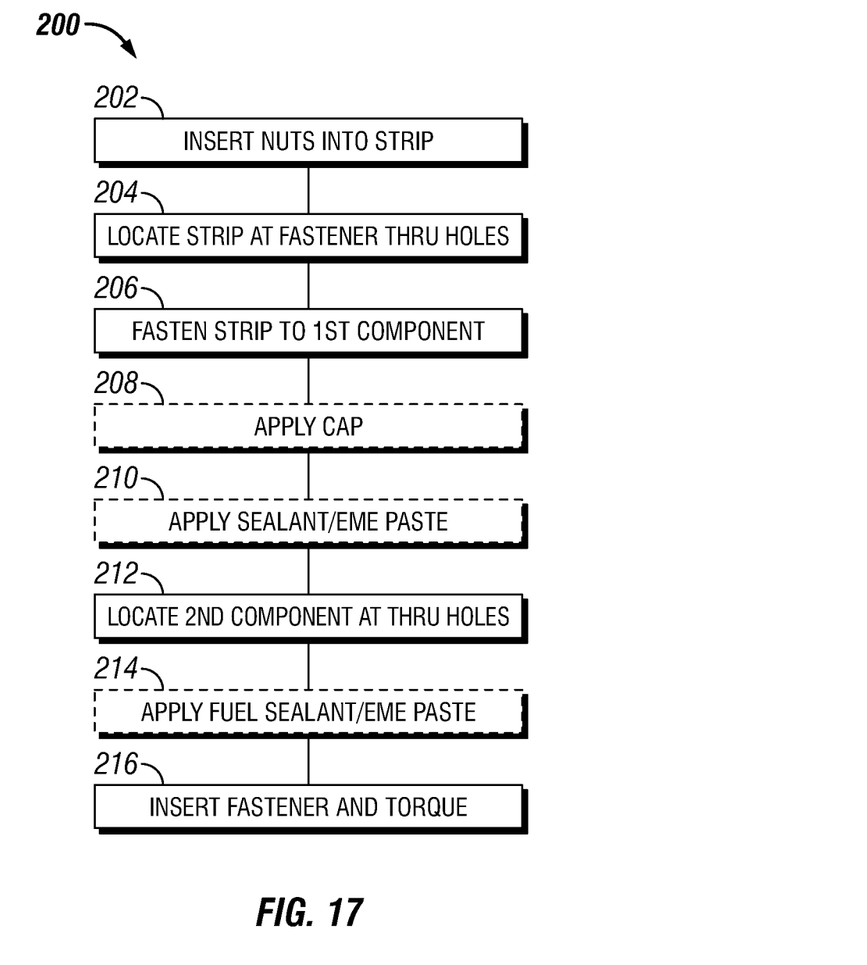
FIG. 17 is a schematic flow chart illustrating methods of assembly in accordance with disclosed embodiments.

FIG. 17 is a schematic flow chart illustrating methods of assembly 200 in accordance with disclosed embodiments. For these embodiments, at 202 one or more nuts 22 with anti-rotation features 44B are inserted into the corresponding anti-rotation features 44A on a dielectric nut retainer strip 34. At 204 the dielectric nut retainer strip 34 is located at the fastener thru holes (e.g., FIG. 9, thru holes 16A) of the first component and aligned. At 206 the dielectric nut retainer strip 34 is fastened to the first component (e.g., wing spar 28) using the substructure fastener portions 42 (or 42A-B). For embodiments without an integrally formed cap (e.g. 48A), caps (e.g., 48) may be installed as indicated at 208. At 210 any sealants or EME pastes (e.g., 30, 32) that are needed may be applied. At 212 the second component (e.g., wing skin 26) may be located in final position and the fastener thru holes aligned (e.g., 16A-B). At 214 any additional or final sealants or EME pastes (e.g., 30, 32) may be applied to the fastener thru holes or other parts of the second component. At 216 the fasteners 18 may be inserted and torqued into the nuts 22 to specifications. Other embodiments, ordering of steps, additional steps, or the like, may be dictated by the particular embodiment, location, intended use, environment, or the like, as would be apparent to those of ordinary skill in the art having the benefit of this disclosure.

Although various embodiments have been shown and described, the present disclosure is not so limited and will be understood to include all such modifications and variations are would be apparent to one skilled in the art.

What is claimed is:

1. A fastening system for aerospace vehicles comprising:
   a dielectric nut retainer strip formed of dielectric material comprising at least one fastener thru hole and at least one cap receiver portion;
   an anti-rotation nut retainer portion integrally formed in the dielectric nut retainer strip adjacent to the at least one fastener thru hole;
   a cap configured to mate with the at least one cap receiver portion;
   a fastener; and
   an anti-rotation nut configured to fit in the anti-rotation nut retainer portion and couple with the fastener.

2. The fastening system for aerospace vehicles of claim 1 wherein the cap comprises a dielectric material.

3. The fastening system of claim 1 wherein the fastener is covered in a conductive coating.

4. The fastening system for aerospace vehicles of claim 3 wherein the conductive coating comprises indium paste.

5. The fastening system for aerospace vehicles of claim 3 wherein the conductive coating comprises a conductive sleeve.

6. The fastening system for aerospace vehicles of claim 1 further comprising:
   a stiffening member formed in the dielectric nut retainer strip; and
   a substructure fastener portion on the dielectric nut retainer strip configured to engage at least a portion of an aerospace vehicle substructure.

7. The fastening system for aerospace vehicles of claim 6 wherein the substructure fastener portion is configured to engage a portion of a substructure that is interior to an aerospace vehicle wing.

8. The fastening system for aerospace vehicles of claim 7 wherein the fastener is insertable from outside the aerospace vehicle wing into the at least one fastener thru hole of the dielectric nut retainer strip.

9. The fastening system for aerospace vehicles of claim 1, wherein the dielectric nut retainer strip is formed from a crystallizable polyamide.

10. A dielectric nut retainer system comprising:
    a dielectric nut retainer strip comprising:
      one or more fastener thru holes;
      an integrally formed nut retention pocket adjacent to each of the one or more fastener thru holes;
      a cap formed at each of the one or more fastener thru holes on an opposite side from the nut retention pocket; and
      a dielectric nut retainer strip attachment hole that enables attachment of the dielectric nut retainer strip to a structural element; and
    at least one anti-rotation nut configured to engage the nut retention pocket.

11. The dielectric nut retainer system of claim 10 further comprising:
    at least one fastener configured to be insertable into the one or more fastener thru holes.

12. The dielectric nut retainer system of claim 11, wherein the fastener is covered in a conductive coating.

13. The dielectric nut retainer system of claim 12, wherein the conductive coating comprises indium paste.

14. The dielectric nut retainer system of claim 12, wherein the conductive coating comprises a conductive sleeve.

15. The dielectric nut retainer system of claim 10, wherein the cap comprises a dielectric material.

16. The dielectric nut retainer system of claim 10, further comprising a stiffening member formed in the dielectric nut retainer strip.

17. The dielectric nut retainer system of claim 10, wherein the structural element is at least a portion of an aerospace vehicle substructure.

18. The dielectric nut retainer system of claim 10, wherein the structural element is a portion of a substructure that is interior to an aerospace vehicle wing.

19. The dielectric nut retainer system of claim 18, wherein the fastener is insertable from outside the aerospace vehicle wing into the at least one fastener thru hole of the dielectric nut retainer strip.

20. The dielectric nut retainer system of claim 10, wherein the dielectric nut retainer strip is formed from a crystallizable polyamide.

* * * * *